United States Patent
Jung et al.

(10) Patent No.: US 9,778,525 B2
(45) Date of Patent: Oct. 3, 2017

(54) DISPLAY DEVICE

(71) Applicant: Samsung Display Co., Ltd., Yongin, Gyeonggi-do (KR)

(72) Inventors: Kwang-Chul Jung, Seongnam-si (KR); Se Young Song, Hwaseong-si (KR); Sung-Jin Hong, Hwaseong-si (KR); Jae Byung Park, Seoul (KR); Mee Hye Jung, Suwon-si (KR); Hyun Min Cho, Seoul (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 155 days.

(21) Appl. No.: 14/639,749

(22) Filed: Mar. 5, 2015

(65) Prior Publication Data

US 2015/0255026 A1 Sep. 10, 2015

(30) Foreign Application Priority Data

Mar. 6, 2014 (KR) ........................ 10-2014-0026721

(51) Int. Cl.
*G09G 5/02* (2006.01)
*G02F 1/1362* (2006.01)
(Continued)

(52) U.S. Cl.
CPC ....... *G02F 1/13624* (2013.01); *G09G 3/3648* (2013.01); *G02F 1/1368* (2013.01);
(Continued)

(58) Field of Classification Search
None
See application file for complete search history.

(56) References Cited

U.S. PATENT DOCUMENTS 7,864,149 B2  1/2011 Do et al.
8,174,472 B2  5/2012 Lee
(Continued)

FOREIGN PATENT DOCUMENTS

JP  7-13191 A     1/1995
JP  2006-201594 A  8/2006
JP  2008-158286 A  7/2008

OTHER PUBLICATIONS

Lee et al., "Novel Color-Sequential Transflective Liquid Crystal Displays," *Journal of Display Technology*, vol. 3, No. 1, Mar. 2007, pp. 2-8.
(Continued)

*Primary Examiner* — Ifedayo Iluyomade
(74) *Attorney, Agent, or Firm* — Knobbe Martens Olson & Bear LLP

(57) ABSTRACT

A display device is disclosed. In one aspect, the display device includes a plurality of pixels each including first and second switching elements connected to a first gate line and a data line. Each pixel also includes a first memory capacitor connected to the first switching element and a capacitance voltage line, a second memory capacitor connected to the second switching element and the capacitance voltage line, and a third switching element and a fourth switching element each connected to a second gate line and a reference voltage line. Each pixel further includes a fifth switching element connected to a third gate line and the first memory capacitor, a sixth switching element connected to the third gate line and the second memory capacitor, a first subpixel electrode connected to the third and fifth switching elements, and a second subpixel electrode connected to the fourth and sixth switching element.

20 Claims, 9 Drawing Sheets

(51) Int. Cl.
    *G02F 1/1368*    (2006.01)
    *G09G 3/36*      (2006.01)
    *G02F 1/1343*    (2006.01)

(52) U.S. Cl.
    CPC ............ *G02F 2001/134345* (2013.01); *G09G 3/3614* (2013.01); *G09G 2300/0447* (2013.01); *G09G 2300/0814* (2013.01)

(56) References Cited

U.S. PATENT DOCUMENTS

| | | |
|---|---|---|
| 8,179,344 B2 | 5/2012 | Hsieh et al. |
| 8,203,520 B2 | 6/2012 | Shimoshikiryoh |
| 8,362,988 B2 | 1/2013 | Hsieh et al. |
| 8,379,177 B2 | 2/2013 | Jung et al. |
| 2002/0158587 A1* | 10/2002 | Komiya ............... G09G 3/3258 315/169.3 |
| 2008/0284931 A1* | 11/2008 | Kimura ............... G02F 1/13624 349/39 |
| 2009/0190052 A1 | 7/2009 | Jung et al. |
| 2010/0182298 A1 | 7/2010 | Song |
| 2011/0261028 A1 | 10/2011 | Goh et al. |
| 2012/0169705 A1 | 7/2012 | Luo et al. |
| 2012/0268676 A1 | 10/2012 | Kim et al. |

OTHER PUBLICATIONS

Luo et al., "P-205L: Late-News Poster: A Novel Pixel Circuit for Field Sequential Color LCD," *SID 11 Digest*, ISSN 0097-966X/11/4203-1344, © 2011 SID, pp. 1344-1347.

* cited by examiner

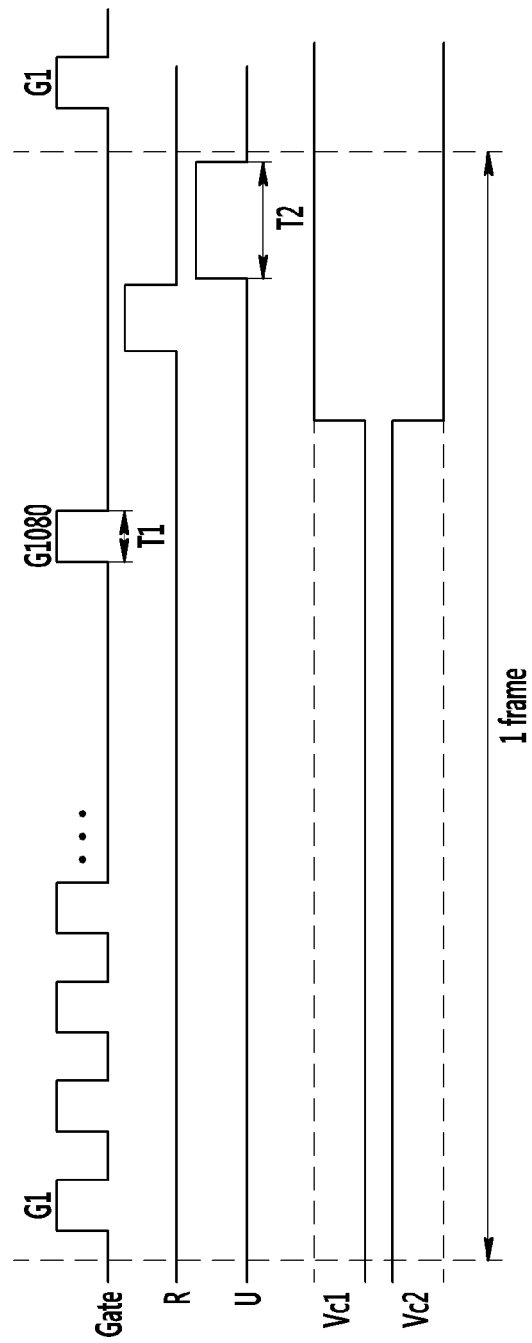

DISPLAY DEVICE

CROSS-REFERENCE TO RELATED APPLICATION

This application claims priority to and the benefit of Korean Patent Application No. 10-2014-0026721 filed in the Korean Intellectual Property Office on Mar. 6, 2014, the entire contents of which are incorporated herein by reference.

BACKGROUND

Field

The described technology generally relates to a display device.

Description of the Related Technology

Liquid crystal displays (LCDs) are one of the most common types of flat panel displays currently in use. LCDs include two display substrates with field generating electrodes such as a pixel electrode, a common electrode, or the like, and a liquid crystal layer interposed therebetween. LCDs generate an electric field in the liquid crystal layer by applying a voltage to the field generating electrodes to induce the alignment of liquid crystal molecules of the liquid crystal layer through the generated electric field and thus control the polarization of incident light in order to display images.

To display color with an LCD, color filters for each of the three primary colors or a plurality of light sources emitting one of the three primary colors can be employed. Alternately, each frame to be displayed can be divided into a plurality of subframes and a plurality of pixels can be driven via time division.

SUMMARY OF CERTAIN INVENTIVE ASPECTS

One inventive aspect is a liquid crystal display having a simplified driving method when dividing a pixel into two subpixels and driving them that can prevent deterioration of display quality caused by mixture of a previous frame image and a subsequent frame image.

Another aspect is a display device including: a substrate; a first gate line, a second gate line, a third gate line, a reference voltage line, a capacitance voltage line, and a data line formed on the substrate; a first switching element and a second switching element connected to the gate line and the data line; a first memory capacitor connected to an output end of the first switching element and the capacitance voltage line and a second memory capacitor connected to an output end of the second switching element and the capacitance voltage line; a third switching element and a fourth switching element connected to the second gate line and the reference voltage line; a fifth switching element connected to the third gate line and the first memory capacitor; a sixth switching element connected to the third gate line and the second memory capacitor; a first subpixel electrode connected to the third switching element and the fifth switching element; and a second subpixel electrode connected to the fourth switching element and the sixth switching element, wherein the first subpixel electrode and the second subpixel electrode are provided on a pixel.

The data line includes a first data line and a second data line which neighbor each other and to which data voltages with different polarities are applied, the capacitance voltage line includes a first capacitance voltage line and a second capacitance voltage line to which capacitance voltages with different polarities are applied, the first switching element and the second switching element of a first pixel from among the first pixel and a second pixel neighboring each other are connected to the first data line, the first memory capacitor and the second memory capacitor of the first pixel are connected to the first capacitance voltage line, the first switching element and the second switching element of the second pixel are connected to the second data line, and the first memory capacitor and the second memory capacitor of the first pixel are connected to the second capacitance voltage line.

The polarity of the data voltage applied to the first data line corresponds to the polarity of the capacitance voltage applied to the first capacitance voltage line and the polarity of the data voltage applied to the second data line corresponds to the polarity of the capacitance voltage applied to the second capacitance voltage line.

The first gate line includes a plurality of gate lines, a gate-on signal is applied to the second gate line when the gate-on signal is applied to the gate lines, a gate-on signal is applied to the third gate line when the gate-on signal is applied to the second gate line, and a time when the gate-on signal is applied to the third gate line is longer than a time when the gate-on signal is applied to the gate lines.

The area of the first subpixel electrode is different from the area of the second subpixel electrode and the capacitance of the first memory capacitor is different from the capacitance of the second memory capacitor.

The first subpixel electrode is connected to output terminals of the third switching element and the fifth switching element and the second subpixel electrode is connected to output terminals of the fourth switching element and the sixth switching element.

Another aspect is a display device, comprising a substrate; a first gate line, a second gate line, a third gate line, a reference voltage line, at least one capacitance voltage line, and at least one data line formed over the substrate; and a plurality of pixels, wherein each pixel comprises: a first switching element and a second switching element each connected to the first gate line and the data line; a first memory capacitor connected to the first switching element and the capacitance voltage line; a second memory capacitor connected to the second switching element and the capacitance voltage line; a third switching element and a fourth switching element each connected to the second gate line and the reference voltage line; a fifth switching element connected to the third gate line and the first memory capacitor; a sixth switching element connected to the third gate line and the second memory capacitor; a first subpixel electrode connected to the third and fifth switching elements; and a second subpixel electrode connected to the fourth and sixth switching elements.

The at least one data line can include a first data line and a second data line configured to receive data voltages having polarities different from each other, the at least one capacitance voltage line can include a first capacitance voltage line and a second capacitance voltage line configured to receive capacitance voltages having polarities different from each other, the first and second switching elements of a first pixel can be connected to the first data line, the first and second memory capacitors of the first pixel can be connected to the first capacitance voltage line, the first and second switching elements of a second pixel neighboring the first pixel can be connected to the second data line, the first and second memory capacitors of the second pixel can be connected to the second capacitance voltage line, the polarity of the data voltage applied to the first data line can be the same as the polarity of the capacitance voltage applied to the first capacitance voltage line, and the polarity of the data voltage applied to the second data line can be the same as the polarity of the capacitance voltage applied to the second capacitance voltage line. The first gate line can be configured to receive a first gate-on signal, the second gate line can be configured to receive a second gate-on signal after the first gate-on signal is applied to the first gate line, the third gate line can be configured to receive a third gate-on signal after the second gate-on signal is applied to the second gate line, and the duration time of the third gate-on signal can be greater than the duration time of each of the first and second gate-on signals.

The area of the first subpixel electrode can be different from the area of the second subpixel electrode. The capacitance of the first memory capacitor can be different from the capacitance of the second memory capacitor. The first subpixel electrode can be connected to the third and fifth switching elements and the second subpixel electrode can be connected to the fourth and sixth switching elements. The area of the first subpixel electrode can be different from the area of the second subpixel electrode and the capacitance of the first memory capacitor can be different from the capacitance of the second memory capacitor. The first subpixel electrode can be connected to the third and fifth switching elements and the second subpixel electrode can be connected to the fourth and sixth switching elements. The first gate line can be configured to receive a first gate-on signal, the second gate line can be configured to receive a second gate-on signal after the first gate-on signal is applied to the first gate line, the third gate line can be configured to receive a third gate-on signal after the second gate-on signal is applied to the second gate line, and the duration time of the third gate-on signal can be greater than the duration time of each of the first and second gate-on signals.

The area of the first subpixel electrode can be different from the area of the second subpixel electrode. The capacitance of the first memory capacitor can be different from the capacitance of the second memory capacitor. The first subpixel electrode can be connected to the third and fifth switching elements and the second subpixel electrode can be connected to the fourth and sixth switching elements. The area of the first subpixel electrode can be different from the area of the second subpixel electrode and the capacitance of the first memory capacitor can be different from the capacitance of the second memory capacitor. The first subpixel electrode can be connected to the third and fifth switching elements and the second subpixel electrode can be connected to the fourth and sixth switching elements.

Another aspect is a display device, comprising a substrate; a plurality of reference voltage lines, a plurality of gate lines, a plurality of refresh gate lines, a plurality of update gate lines, a plurality of capacitance voltage lines, and a plurality of data lines; a plurality of pixels each including at least two subpixels, wherein each subpixel comprises: a switching transistor connected to one of the gate lines and one of the data lines; a refresh transistor connected to one of the refresh gate lines and one of the reference voltage lines; an update transistor connected to one of the update gate lines, the switching transistor and the refresh transistor; a memory capacitor connected to one of the capacitance voltage lines and the update transistor; and a subpixel electrode connected to the refresh transistor and the update transistor, wherein the subpixels of each pixel share the same reference voltage, gate, refresh gate, update gate, capacitance voltage and data lines.

Two neighboring pixels can share the same reference voltage, gate, refresh gate and update gate lines and can be connected to different data and capacitance voltage lines. The areas of the subpixel electrodes of each pixel can be different from each other. The capacitances of the memory capacitors of the subpixels of each pixel can be different from each other. In one frame, each of the subpixels can be configured to receive a data voltage at the memory capacitor; reset the charge stored in the subpixel electrode; and apply the data voltage from the memory capacitor to the subpixel electrode. The subpixels of each pixel can be configured to substantially simultaneously receive the data voltages from the corresponding memory capacitors.

According to at least one embodiment, the driving method is simplified when a single pixel is divided into two subpixels which are then driven and the deterioration of display quality induced by the mixture of the previous frame image and the subsequent frame image can be prevented.

BRIEF DESCRIPTION OF THE DRAWINGS

FIG. 2 shows a waveform diagram illustrating signals applied to a display device according to an exemplary embodiment.

DETAILED DESCRIPTION OF CERTAIN INVENTIVE EMBODIMENTS

Figure 1:
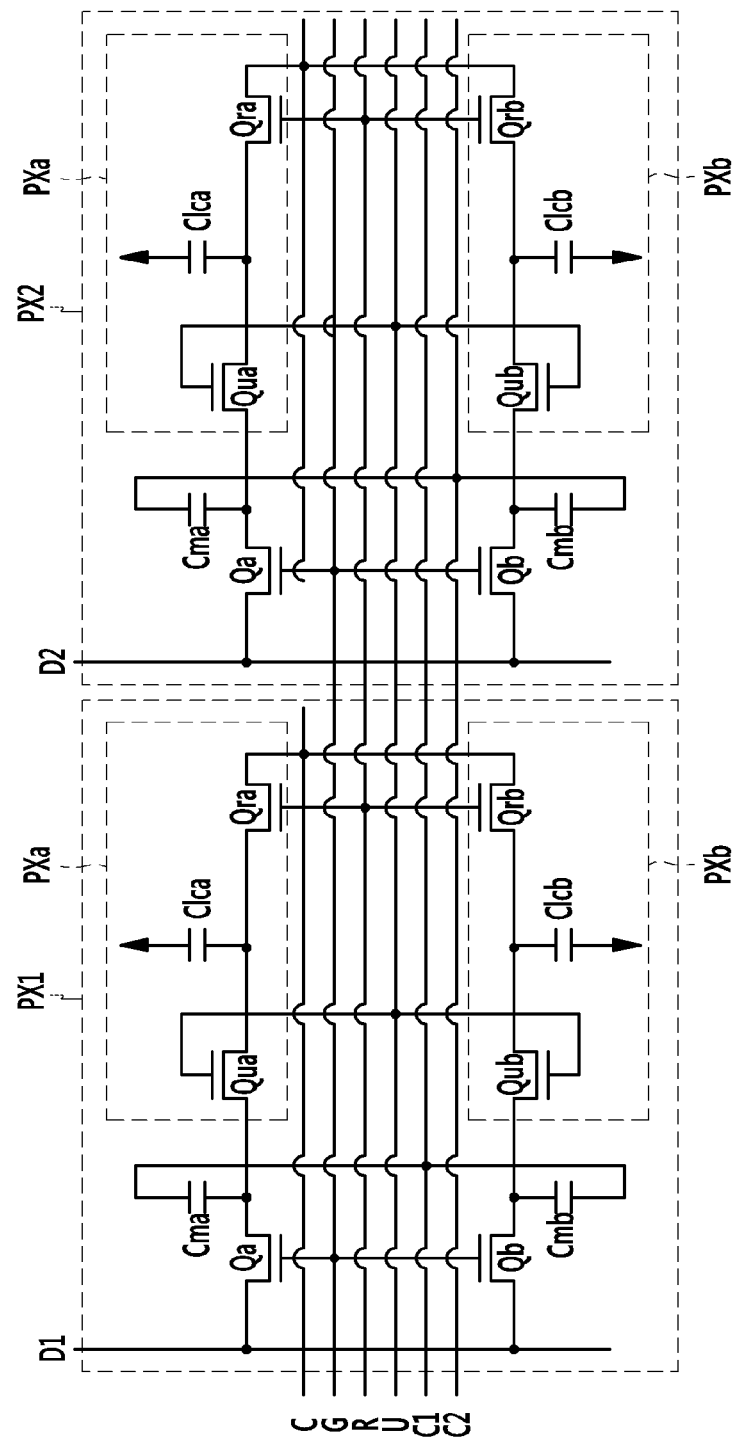
FIG. 1 shows an equivalent circuit diagram of a pixel of a display device according to an exemplary embodiment.

When the pixels of an LCD are driven by time division, a lower pixel row of a first frame for displaying a first color and an upper pixel row of a second frame for displaying a second color different from the first color can be simultaneously viewed, resulting in a mixture of observed colors and thus negatively affecting display quality.

Additionally, in the display of 3D images left and right-eye images are distinguished by subframe division and the left-eye image and the right-eye image can mix, thus reducing image quality.

One type of LCD includes a vertically aligned (VA) mode for arranging a long axis of liquid crystal molecules to be perpendicular to a display panel when no electric field is applied. These VA mode LCDs have received increasing attention because of their high contrast ratio and wide reference viewing angles. Here, the reference viewing angle refers to a viewing angle having a contrast ratio of 1:10 or an inter-gray luminance reversal limit angle.

By dividing one pixel into two subpixels and supplying different voltages to the two subpixels transmittance can be changed for the purpose of bringing lateral visibility to be close to front visibility. Typically, when one pixel is divided into two subpixels the driving technique becomes complicated.

The described technology will be described more fully hereinafter with reference to the accompanying drawings, in which exemplary embodiments are shown. As those skilled in the art would realize, the described embodiments may be modified in various different ways, all without departing from the spirit or scope of the described technology.

In the drawings, the thickness of layers, films, panels, regions, etc., may be exaggerated for the sake of clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A display device according to an exemplary embodiment will now be described with reference to FIG. 1. FIG. 1 shows an equivalent circuit diagram of a pixel of the display device according to an exemplary embodiment.

Referring to FIG. 1, the display device includes a plurality of signal lines (G, D, C, R, and U) and a plurality of pixels PX connected thereto.

In the embodiment of FIG. 1, the signal lines (G, D, C, R, and U) include a plurality of gate lines (G), a plurality refresh gate lines (R), and a plurality of update gate lines (U) for transmitting gate signals (also called scanning signals). The signal lines also (G, D, C, R, and U) include a plurality of data lines D1 and D2 for transmitting data voltages, a reference voltage line (C) for applying a reference voltage, and capacitance voltage lines C1 and C2 for applying capacitance voltages Vc1 and Vc2. A first capacitance voltage Vst1 and a second capacitance voltage Vst2 having opposing phase periods are applied to the capacitance voltage lines C1 and C2.

The gate lines (G), the refresh gate lines (R), the update gate lines (U), the reference voltage line (C), and the capacitance voltage lines C1 and C2 extend in a row direction and are substantially parallel to each other. Similarly, The data lines D1 and D2 extend in a column direction and are substantially parallel to each other.

The refresh gate lines (R) are connected to the pixels PX to apply a gate-on signal to the pixels PX and the update gate lines (U) are connected to the pixels PX to apply a gate-on signal to the pixels PX.

Each pixel PX includes a pair of subpixels including a first subpixel (PXa) and a second subpixel (PXb). Further, each pixel PX includes a first switching element or first switching transistor Qa and a second switching element or second switching transistor Qb connected to the first subpixel (PXa) and the second subpixel (PXb), a first refresh switching element or first refresh transistor (Qra), a second refresh switching element or second refresh transistor (Qrb), a first update switching element or first update transistor (Qua), a second update switching element or second update transistor (Qub), a first memory capacitor (Cma), a second memory capacitor (Cmb), a first liquid crystal capacitor (Clca), and a second liquid crystal capacitor (Clcb).

The first switching element Qa and the second switching element Qb are three-terminal elements such as a thin film transistor. The control terminals of the first switching element Qa and the second switching element Qb are connected to the gate lines (G) and their input terminals are connected to the data lines (D). The output terminal of the first switching element Qa is connected to one of two terminals of the first memory capacitor (Cma) and the output terminal of the second switching element Qb is connected to one of two terminals of the second memory capacitor (Cmb). The other terminal of the first memory capacitor (Cma) and the other terminal of the second memory capacitor (Cmb) are connected to one of the capacitance voltage lines C1 and C2. The first memory capacitor (Cma) and the second memory capacitor (Cmb) of one pixel PX are connected to the capacitance voltage lines C1 or C2.

The first refresh switching element (Qra) and the second refresh switching element (Qrb) are three-terminal elements such as a thin film transistor, their control terminals are connected to the refresh gate line (R), their input terminals are connected to the reference voltage line (C), and their output terminals are respectively connected to the first liquid crystal capacitor (Clca) and the second liquid crystal capacitor (Clcb).

The first update switching element (Qua) and the second update switching element (Qub) are three-terminal elements such as a thin film transistor, their control terminals are connected to the update gate line (U), their input terminals are respectively connected to the first memory capacitor (Cma) and the second memory capacitor (Cmb), and their output terminals are respectively connected to the first liquid crystal capacitor (Clca) and the second liquid crystal capacitor (Clcb). The first and second liquid crystal capacitors (Clca) and (Clcb) have common electrodes (not shown), as two terminals, that are formed on a substrate facing a first subpixel electrode (not shown) and a second subpixel electrode (not shown) connected to the output terminals of the first and second update switching elements (Qua) and (Qub).

Data voltages with different polarities are applied to the data lines D1 and D2 connected to two neighboring pixels PX. Thus, the first and second memory capacitors (Cma) and the (Cmb) of the neighboring two pixels PX are connected to different capacitance voltage lines C1 and C2. Capacitance voltages with different polarities are applied to the capacitance voltage lines C1 and C2 and the polarity of the capacitance voltage is changed depending on the frame. In addition, the polarities of the data voltage and the capacitance voltage respectively applied to the data lines D1 and D2 and the capacitance voltage lines C1 and C2 connected to the first memory capacitor (Cma) are the same.

According to another exemplary embodiment, data voltages with the same polarity are applied to the data lines D1 and D2 connected to the two neighboring pixels PX. In this embodiment, the first memory capacitor (Cma) and the second memory capacitor (Cmb) of the two neighboring pixels PX are connected to the same capacitance voltage line C1 or C2 and the other capacitance voltage line C1 or C2 is omitted.

A method for driving a display device according to an exemplary embodiment will now be described with reference to FIG. 2 together with FIG. 1. FIG. 2 shows a waveform diagram of a signal applied to a display device according to an exemplary embodiment.

Referring to FIG. 1 and FIG. 2, a gate-on signal is sequentially applied to a plurality of gate lines (G). In the embodiment of FIG. 2, the display device driven includes 1080 gate lines starting from the first gate line G1. However, the described technology is not restricted thereto, and display devices according to other exemplary embodiments may include a different number of gate lines (G).

When the gate-on signal is applied to the gate lines (G), the first and second switching elements Qa and Qb of each pixel PX are turned on and the data voltages transmitted through the data lines D1 and D2 are stored in the first and second memory capacitors (Cma) and (Cmb) of each pixel PX. When the gate-on signal applied to the gate line (G) is changed to the gate-off signal, one terminal of each of the first and second memory capacitors (Cma) and (Cmb) is floated and capacitance voltages Vc1 and Vc2 are applied to the capacitance voltage lines C1 and C2 connected to the other terminals of each of the first and second memory capacitors (Cma) and (Cmb). The capacitance voltages Vc1 and Vc2 applied to the capacitance voltage lines C1 and C2 may have the same polarity as the data voltages applied to the data lines D1 and D2 and an absolute value of the former may be greater than that of the latter. Accordingly, the data voltages stored in the first and second memory capacitors (Cma) and (Cmb) are boosted.

When the gate signal applied to the refresh gate line (R) is changed to the gate-on signal, the first and second refresh switching elements (Qra) and (Qrb) of each pixel PX are turned on and a reference voltage applied through a reference voltage line (C) is applied to the first and second liquid crystal capacitors (Clca) and (Clcb) through the first and second refresh switching elements (Qra) and (Qrb). The reference voltage is a voltage similar to a common voltage, and thus, the voltages stored in the first and second liquid crystal capacitors (Clca) and (Clcb) are reset.

After the gate-on signal of the refresh gate line (R) is changed to the gate-off signal and the voltages stored in the first and second liquid crystal capacitors (Clca) and (Clcb) of all pixels PX are reset with the common voltage, the gate signal of the update gate line (U) is changed to the gate-on signal.

When the gate-on signal is applied to the update gate line (U), the first and second update switching elements (Qua) and (Qub) are turned on and the voltages stored in the first and second memory capacitors (Cma) and (Cmb) are respectively applied to the first and second liquid crystal capacitors (Clca) and (Clcb) through the first and second update switching elements (Qua) and (Qub).

The second time T2 where the gate-on signal of the update gate line (U) is maintained is greater than the first time T1 where the gate-on signal of the gate line (G) is maintained. The gate-on signal of the update gate line (U) can be substantially simultaneously applied to a plurality of pixels PX by setting the second time T2 when the gate-on signal of the update gate line (U) is maintained to be longer than a minimum period. Although not shown, the time when the gate-on signal of the refresh gate line (R) is maintained may be greater than the first time T1 when the gate-on signal of the gate line (G) is maintained.

In the embodiment of FIGS. 1 and 2, the area of the first liquid crystal capacitor (Clca) is different from the area of the second liquid crystal capacitor (Clcb) so that when the same voltage is stored in the first memory capacitor (Cma) and the second memory capacitor (Cmb), the voltage stored in the first liquid crystal capacitor (Clca) may be different from the voltage stored in the second liquid crystal capacitor (Clcb). In further detail, since the area of the second liquid crystal capacitor (Clcb) is greater than the area of the first liquid crystal capacitor (Clca) in some embodiments, the voltage across the first liquid crystal capacitor (Clca) is greater than the voltage across the second liquid crystal capacitor (Clcb) even though the same amount of charge is stored in the first and second liquid crystal capacitors (Clca) and (Clcb).

In other embodiments, when the area of the first liquid crystal capacitor (Clca) is substantially equal to the area of the second liquid crystal capacitor (Clcb), the voltages stored in the first and second memory capacitors (Cma) and (Cmb) may be different from each other, causing the voltage stored in the first liquid crystal capacitor (Clca) to become different from the voltage stored in the second liquid crystal capacitor (Clcb). In further detail, when the capacitance of the first memory capacitor (Cma) is greater than the capacitance of the second memory capacitor (Cmb) and the charge stored in the first and second memory capacitors (Cma) and (Cmb) are respectively applied to the first and second liquid crystal capacitors (Clca) and (Clcb) having substantially the same area, the voltage across the first liquid crystal capacitor (Clca) is greater than the voltage across the second liquid crystal capacitor (Clcb).

According to at least one embodiment, the relative voltages of the first and second liquid crystal capacitors (Clca) and (Clcb) is controlled by controlling at least one of the ratio of the area of the first liquid crystal capacitor (Clca) to the area of the second liquid crystal capacitor (Clcb) and the ratio of the capacitance of the first memory capacitor (Cma) to the capacitance of the second memory capacitor (Cmb). Therefore, the voltage across the first liquid crystal capacitor (Clca) is different from the voltage across the second liquid crystal capacitor (Clcb). Since the voltage of the first liquid crystal capacitor (Clca) is different from the voltage of the second liquid crystal capacitor (Clcb), the angles of liquid crystal molecules arranged in each of the first and second subpixels are different and the luminance of the two subpixels is also different. Accordingly, an image viewed from a lateral side can be controlled to be close to an image viewed from a front side by appropriately controlling the voltage of the first liquid crystal capacitor (Clca) and the voltage of the second liquid crystal capacitor (Clcb), thereby improving the lateral visibility of the display.

Further, during one frame, the first and second memory capacitors (Cma) and (Cmb) of a plurality of pixels PX are charged with a predetermined amount of charge, the charge stored in each of the first and second liquid crystal capacitors (Clca) and (Clcb) of a plurality of pixels PX is reset, and then the charge stored in the first and second memory capacitors (Cma) and (Cmb) are substantially simultaneously supplied into the first and second subpixels (PXa) and (PXb) of a plurality of pixels PX in a plurality of pixel rows.

Therefore, the rear pixel row and the front pixel row are not simultaneously driven during two neighboring frames and the mixture of colors or images can be prevented, thereby preventing deterioration of images formed on the display.

The configuration of a display device according to an exemplary embodiment will now be described with reference to FIG. 3A, FIG. 3B, and FIG. 4 to FIG. 6

Figure 3A:
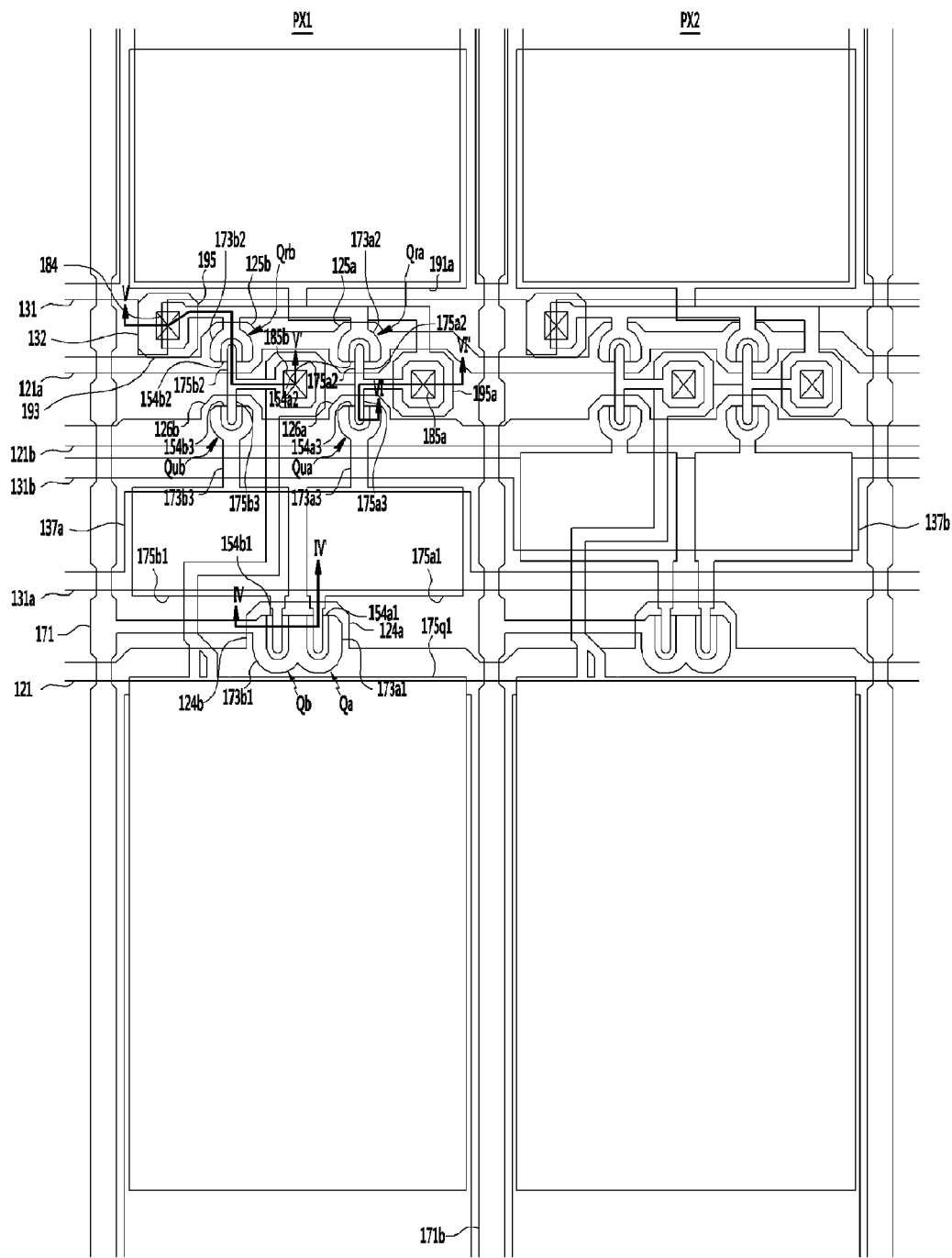
FIG. 3A shows a layout view of a display device according to an exemplary embodiment.
Figure 3B:
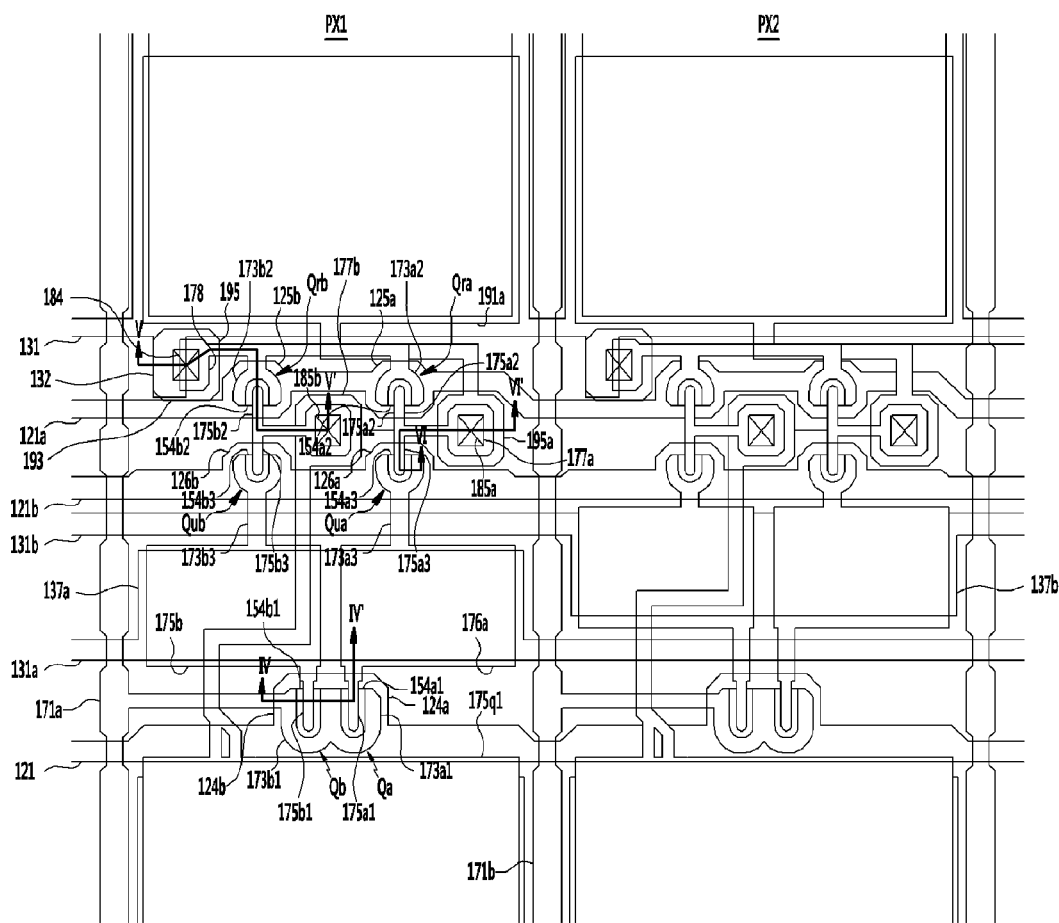
FIG. 3B shows a layout view of part of the display device shown in FIG. 3A.
Figure 4:
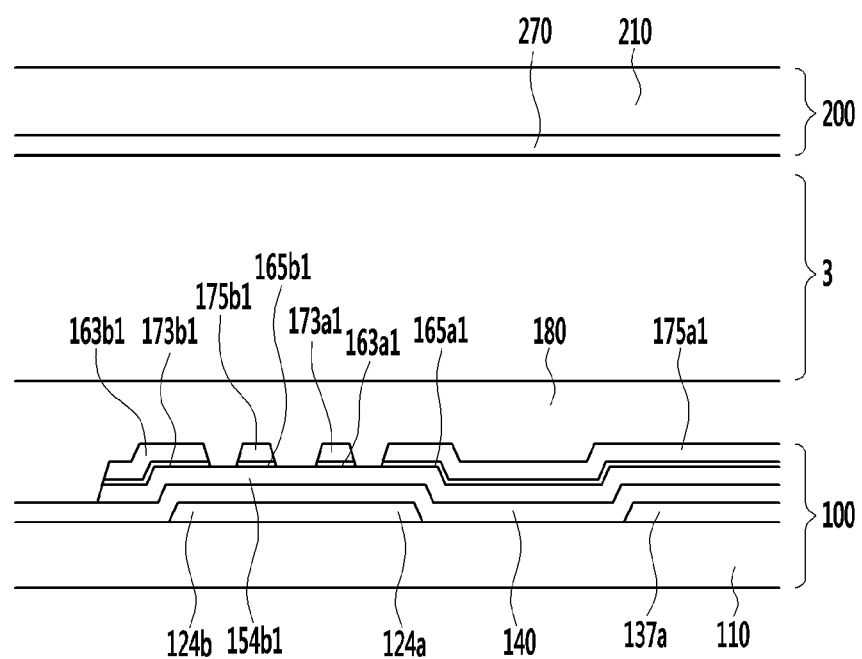
FIG. 4 shows a cross-sectional view of the liquid crystal display of FIG. 3A taken along line IV-IV'.
Figure 5:
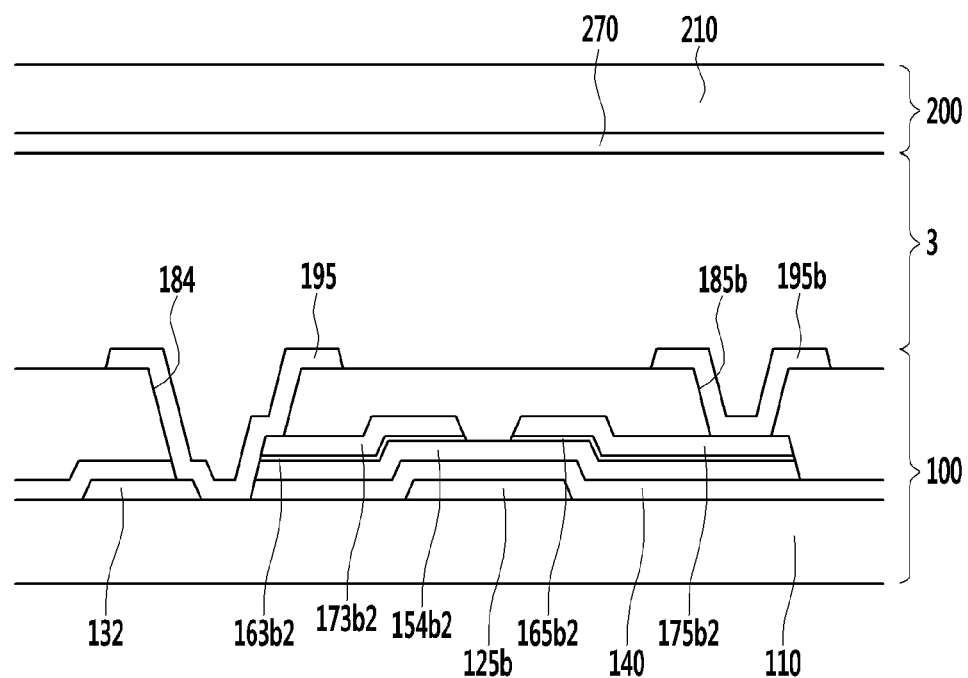
FIG. 5 shows a cross-sectional view of the liquid crystal display of FIG. 3A taken along line V-V'.
Figure 6:
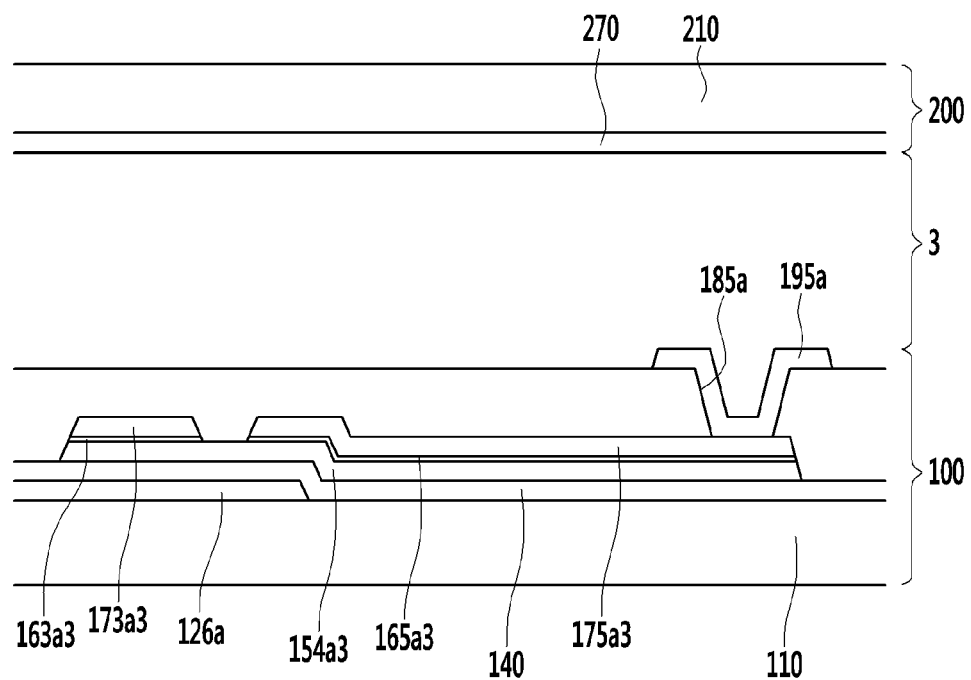
FIG. 6 shows a cross-sectional view of the liquid crystal display shown in FIG. 3A taken along line VI-VI'.

FIG. 3A shows a layout view of a display device according to an exemplary embodiment. FIG. 3B shows a layout view of part of the display device of FIG. 3A. FIG. 4 shows a cross-sectional view of the liquid crystal display of FIG. 3A taken along line IV-IV'. FIG. 5 shows a cross-sectional view of the liquid crystal display of FIG. 3A taken along line V-V'. FIG. 6 shows a cross-sectional view of the liquid crystal display of FIG. 3A taken along line VI-VI'.

Referring to FIG. 3A, FIG. 3B, and FIG. 4 to FIG. 6, the display device includes a first display panel 100 and a second display panel 200 facing each other. A liquid crystal layer 3 is injected between the first and second display panels 100 and 200.

The first display panel 100 will now be described.

Gate conductors (121, 121a, 121b, 131, 131a, and 131b) including a gate line 121, a refresh gate line 121a, an update gate line 121b, a reference voltage line 131, a first capacitance voltage line 131a, and a second capacitance voltage line 131b are formed on a first substrate 110.

The gate line 121 includes a first gate electrode 124a and a second gate electrode 124b. The refresh gate line 121a includes a third gate electrode 125a and a fourth gate electrode 125b. The update gate line 121b includes a fifth gate electrode 126a and a sixth gate electrode 126b.

The reference voltage line 131 includes a first expansion 132, the first capacitance voltage line 131a includes a first capacitor electrode 137a, and the second capacitance voltage line 131b includes a second capacitor electrode 137b.

A gate insulating layer 140 is formed on the gate conductors (121, 121a, 121b, 131, 131a, and 131b).

A first semiconductor 154a1, a second semiconductor 154b1, a third semiconductor 154a2, a fourth semiconductor 154b2, a fifth semiconductor 154a3, and a sixth semiconductor 154b3 are formed on the gate insulating layer 140.

Ohmic contacts (163a1, 163b1, 163b2, 163a3, 165b1, 165b2, and 165a3) are formed on the first semiconductor 154a1, the second semiconductor 154b1, the third semiconductor 154a2, the fourth semiconductor 154b2, the fifth semiconductor 154a3, and the sixth semiconductor 154b3.

The first to sixth semiconductors 154a1 to 154a3 and 154b1 to 154b3 may include oxide semiconductors and when the semiconductors (154a1, 154a2, 154a3, 154b1, 154b2, and 154b3) include the oxide semiconductors the ohmic contacts may be omitted.

Data conductors (171a, 171b, 173a1, 173a2, 173a3, 173b1, 173b2, 173b3, 175a1, 175a2, 175a3, 175b1, 175b2, and 175b3) including a first data line 171a and a second data line 171b including a first source electrode 173a1 and a second source electrode 173b1, a first drain electrode 175a1, a second drain electrode 175b1, a third source electrode 173a2, a third drain electrode 175a2, a fourth source electrode 173b2, a fourth drain electrode 175b2, a fifth source electrode 173a3, a fifth drain electrode 175a3, a sixth source electrode 173b3, and a sixth drain electrode 175b3 are formed on the ohmic contacts (163a1, 163a3, 163b1, 163b2, 165a1, 165a3, 165b1, and 165b2) and the gate insulating layer 140.

The first drain electrode 175a1 includes a third capacitor electrode 176a overlapping the first capacitor electrode 137a or the second capacitor electrode 137b, and the second drain electrode 175b1 includes a fourth capacitor electrode 176b overlapping the first capacitor electrode 137a or the second capacitor electrode 137b.

The third capacitor electrode 176a and the fourth capacitor electrode 176b of the first pixel PX1 from among the two neighboring pixels PX1 and PX2 overlap the first capacitor electrode 137a, and the third capacitor electrode 176a and the fourth capacitor electrode 176b of the second pixel PX2 overlap the second capacitor electrode 137b.

The third drain electrode 175a2 and the fifth drain electrode 175a3 are connected to each other and include a second expansion 177a. Similarly, the fourth drain electrode 175b2 and the sixth drain electrode 175b3 are connected to each other and include a third expansion 177b.

The third capacitor electrode 176a is connected to the fifth source electrode 173a3 and the fourth capacitor electrode 176b is connected to the sixth source electrode 173b3.

The third source electrode 173a2 and the fourth source electrode 173b2 are connected to each other and include a fourth expansion 178.

The area in which the fifth source electrode 173a3 and the sixth source electrode 173b3 overlap the second capacitance voltage line 131b in the first pixel PX1 is substantially equal to the area in which the fifth source electrode 173a3 and the sixth source electrode 173b3 overlap the first capacitance voltage line 131a in the second pixel PX2.

Accordingly, when the polarity of the capacitance voltage applied to the first capacitance voltage line 131a and the second capacitance voltage line 131b is inverted for each frame, the parasitic capacitances that may occur between the fifth source electrode 173a3 and the sixth source electrode 173b3 and between the first capacitance voltage line 131a and the second capacitance voltage line 131b can be maintained to be substantially constant. As described, deterioration in image quality such as flickering that may occur because of differences of pixel voltages can be prevented by maintaining the parasitic capacitances when inverting the polarity.

Further, the fifth source electrode 173a3 and the sixth source electrode 173b3 overlapping the second capacitance voltage line 131b have a narrow bar form in the first pixel PX1, and the fifth source electrode 173a3 and the sixth source electrode 173b3 overlapping the first capacitance voltage line 131a have a narrow bar form in the second pixel PX2. Therefore, the parasitic capacitance that may be generated between the fifth source electrode 173a3 and the sixth source electrode 173b3 and between the first capacitance voltage line 131a and the second capacitance voltage line 131b can be reduced. Therefore, a reduction of the pixel voltage induced due to the parasitic capacitance can be prevented or reduced.

The first gate electrode 124a, the first semiconductor 154a1, the first source electrode 173a1, and the first drain electrode 175a1 form a first switching element (Qa) and the second gate electrode 124b, the second semiconductor 154b1, the second source electrode 173b1, and the second drain electrode 175b1 form a second switching element (Qb).

The third gate electrode 125a, the third semiconductor 154a2, the third source electrode 173a2, and the third drain electrode 175a2 form a first refresh switching element (Qra) and the fourth gate electrode 125b, the fourth semiconductor 154b2, the fourth source electrode 173b2, and the fourth drain electrode 175b2 form a second refresh switching element (Qrb).

The fifth gate electrode 126a, the fifth semiconductor 154a3, the fifth source electrode 173a3, and the fifth drain electrode 175a3 form a first update switching element (Qua) and the sixth gate electrode 126b, the sixth semiconductor 154b3, the sixth source electrode 173b3, and the sixth drain electrode 175b3 form a second update switching element (Qub).

The first capacitor electrode 137a or the second capacitor electrode 137b, the third capacitor electrode 176a overlapping either of them, and an insulating layer provided between the two overlapping electrodes form a first memory capacitor (Cma). Similarly, the first capacitor electrode 137a or the second capacitor electrode 137b, the fourth capacitor electrode 176b overlapping either of them, and an insulating layer provided between the two overlapping electrodes form a second memory capacitor (Cmb).

The area between the overlapping third capacitor electrode 176a and the first capacitor electrode 137a or the second capacitor electrode 137b may be substantially the same as or different from the area between the overlapping fourth capacitor electrode 176b and the first capacitor electrode 137a or the second capacitor electrode 137b.

Regarding the first pixel PX1 from among the two neighboring pixels PX1 and PX2, the first capacitor electrode 137a overlaps the third capacitor electrode 176a to form a first memory capacitor (Cma) and the first capacitor electrode 137a overlaps the fourth capacitor electrode 176b to form a second memory capacitor (Cmb). Similarly, regarding the second pixel PX2, the second capacitor electrode 137b overlaps the third capacitor electrode 176a to form a first memory capacitor (Cma), and the second capacitor electrode 137b overlaps the fourth capacitor electrode 176b to form a second memory capacitor (Cmb).

A passivation layer 180 is formed on the data conductors 171a, 171b, 173a1, 173a2, 173a3, 173b1, 173b2, 173b3, 175a1, 175a2, 175a3, 175b1, 175b2, and 175b3, exposed portions of the semiconductors 154a1, 154a2, 154a3, 154b1, 154b2, and 154b3, and a part of the gate insulating layer 140.

In some embodiments, the passivation layer 180 includes an inorganic insulating material or an organic insulating material.

The passivation layer 180 includes a first contact hole 185a for exposing the second expansion 177a of the third drain electrode 175a2 and the fifth drain electrode 175a3 and a second contact hole 185b for exposing the third expansion 177b of the fourth drain electrode 175b2 and the sixth drain electrode 175b3.

The passivation layer 180 and the gate insulating layer 140 include a third contact hole 184 for exposing the first expansion 132 of the reference voltage line 131 and the fourth expansion 178 of the third source electrode 173a2 and the fourth source electrode 173b2.

A first subpixel electrode 191a, a second subpixel electrode 191b, and a connecting member 195 are formed on the passivation layer 180.

The first subpixel electrode 191a includes a fourth expansion 195a, and the second subpixel electrode 191b includes a fifth expansion 195b.

The fourth expansion 195a of the first subpixel electrode 191a is formed to cover the first contact hole 185a. Therefore, the first subpixel electrode 191a is connected to the second expansion 177a of the third drain electrode 175a2 and the fifth drain electrode 175a3 and receives a voltage from the third drain electrode 175a2 or the fifth drain electrode 175a3.

Similarly, the fifth expansion 195b of the second subpixel electrode 191b is formed to cover the second contact hole 185b. Therefore, the second subpixel electrode 191b is connected to the third expansion 177b of the fourth drain electrode 175b2 and the sixth drain electrode 175b3 to receive a voltage from the fourth drain electrode 175b2 or the sixth drain electrode 175b3.

The connecting member 195 connects the first expansion 132 of the reference voltage line 131 exposed through the third contact hole 184 and the fourth expansion 178 of the third source electrode 173a2 and the fourth source electrode 173b2 to apply a reference voltage provided through the reference voltage line 131 to the third source electrode 173a2 and the fourth source electrode 173b2.

The area of the first subpixel electrode 191a may be different from or substantially equal to the area of the second subpixel electrode 191b. In some embodiments, the area of the first subpixel electrode 191a is less than the area of the second subpixel electrode 191b.

The second display panel 200 will now be described.

A common electrode 270 is formed on a second substrate 210. A common voltage is applied to the common electrode 270.

Although not shown, a color filter and a light blocking member may be formed on at least one of the first display panel 100 and the second display panel 200 and the color filter and the light blocking member may be formed on the same display panel or different display panels.

The liquid crystal layer 3 is provided between the two display panels 100 and 200 facing each other and includes a plurality of liquid crystal molecules (not shown). The liquid crystal layer 3 may include liquid crystal molecules having negative dielectric anisotropy.

Figure 7:
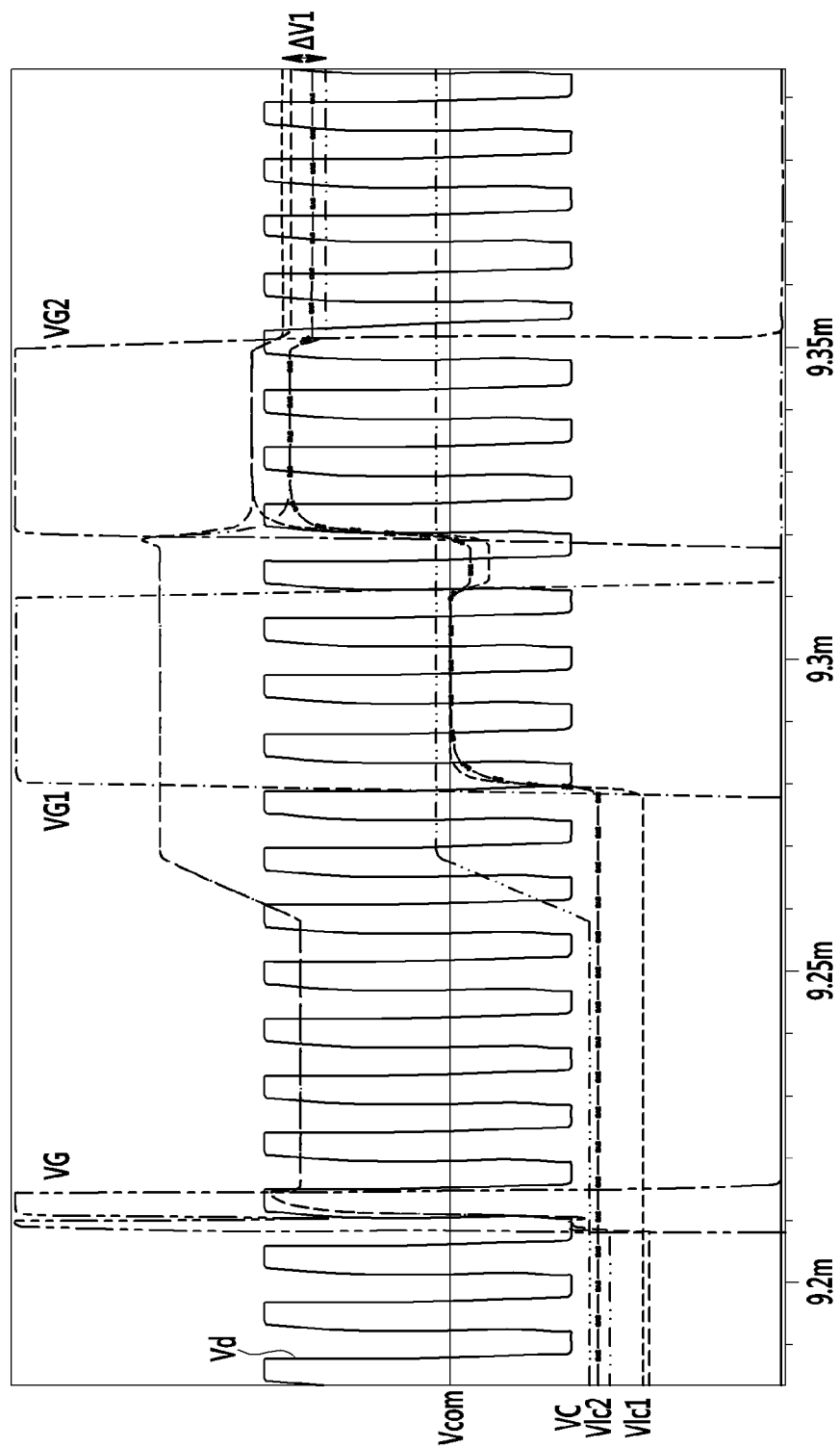
FIG. 7 and FIG. 8 show graphs for illustrating the results of an experimental example of the described technology.
Figure 8:
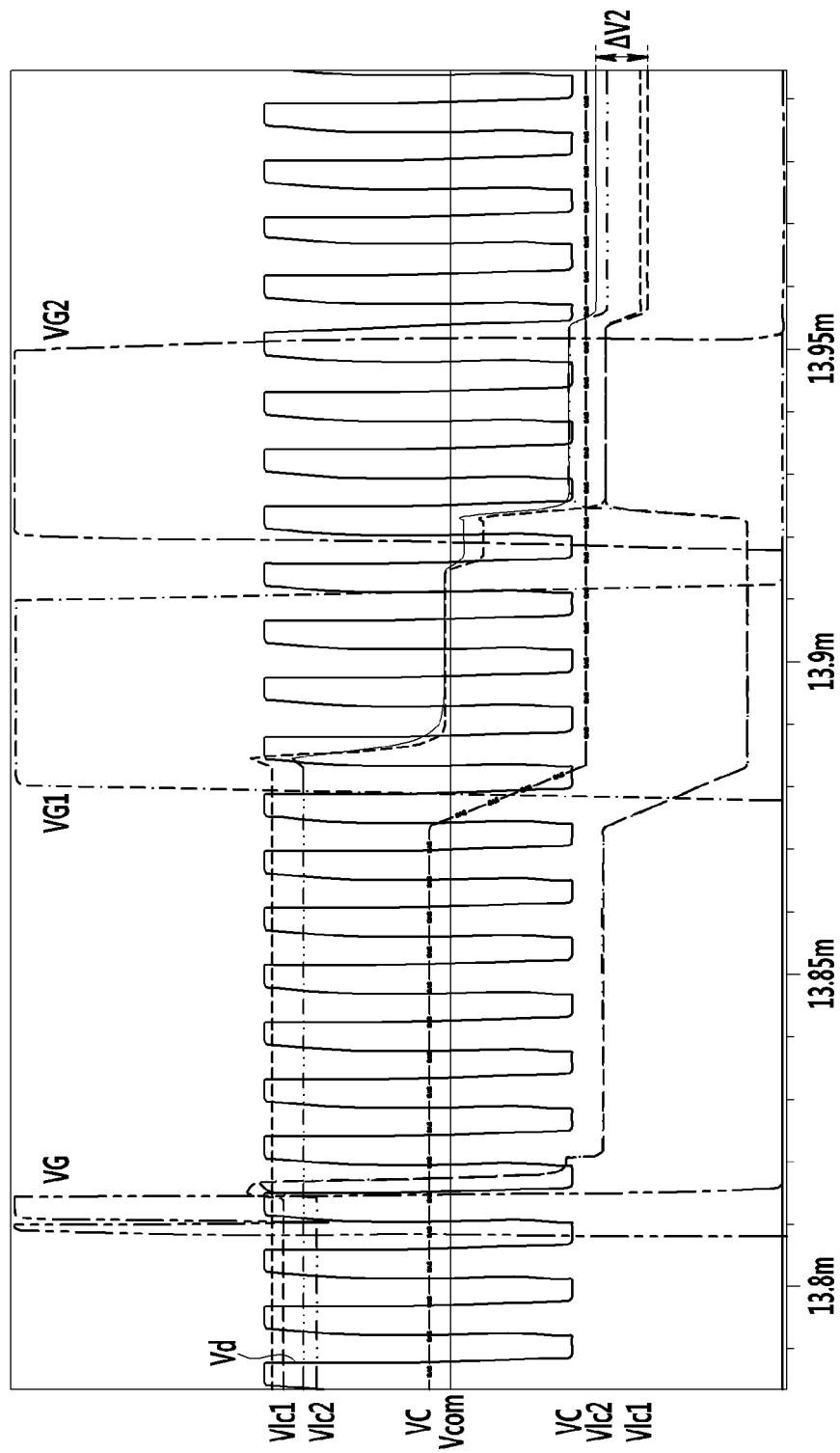

An experimental example will now be described with reference to FIG. 7 and FIG. 8 together with FIG. 1 and FIG. 2. FIG. 7 and FIG. 8 show graphs indicating the results of the experimental example.

In the example of FIGS. 7 and 8, the capacitance of the first and second liquid crystal capacitors (Clca) and (Clcb) due to the respective areas thereof are set to be about 0.355 pF and about 0.6 pF. The capacitance of the first and second memory capacitors (Cma) and (Cmb) are each set to be about 0.55 pF. In the example, a test cell is formed to perform a simulation and its result is shown in FIG. 7 and FIG. 8. FIG. 7 shows a result when a data voltage has positive polarity with respect to the common voltage and FIG. 8 shows a result when a data voltage has negative polarity with respect to the common voltage.

Referring to FIG. 7 and FIG. 8, similar to at least one exemplary embodiment of the described technology, when a gate-on signal (VG) is applied to the gate line (G), the first pixel voltage Vlc1 of the first subpixel (PXa) and the second pixel voltage Vlc2 of the second subpixel (PXb) are charged with the data voltage (Vd). When the gate-on signal applied to the gate line (G) is changed to the gate-off signal and a capacitance voltage (VC) is applied to the capacitance voltages lines C1 and C2, the first pixel voltage Vlc1 of the first subpixel (PXa) and the second pixel voltage Vlc2 of the second subpixel (PXb) are boosted. When the gate-on signal VG1 is applied to the refresh gate line (R), the voltage stored in the first subpixel (PXa) and the second subpixel (PXb) is reset and is then charged with the common voltage. When the gate-on signal VG2 is applied to the update gate line (U), the first pixel voltage Vlc1 of the first subpixel (PXa) and the second pixel voltage Vlc2 of the second subpixel (PXb) are divided to have a first voltage difference ΔV1 according to a difference between the capacitance of the first liquid crystal capacitor (Clca) and the capacitance of the second liquid crystal capacitor (Clcb).

In the experimental example, the ratio of the second pixel voltage Vlc2 of the second subpixel (PXb) to the first pixel voltage Vlc1 of the first subpixel (PXa) is approximately 80%. In further detail, when the data voltage has a positive polarity with respect to the common voltage, the first pixel voltage Vlc1 of the first subpixel (PXa) is about 16 V and the second pixel voltage Vlc2 of the second subpixel (PXb) is about 14.5 V. Also, when the data voltage has a negative polarity with respect to the common voltage, the first pixel voltage Vlc1 of the first subpixel (PXa) is about −1.0 V and the second pixel voltage Vlc2 of the second subpixel (PXb) is about 0.8 V.

Although specific parameters (area, voltage, etc.) were used in the above experimental example, it is expected that substantially the same or similar benefits are obtained from other parameters discussed in connection with FIGS. 1-6.

As described, according to at least one exemplary embodiment, the capacitance of the first and second liquid crystal capacitors (Clca) and (Clcb) can be controlled by controlling the respective areas of the first and second liquid crystal capacitors (Clca) and (Clcb) or the capacitance of the first and second memory capacitors (Cma) and (Cmb).

In addition, during one frame, a predetermined amount of charge is stored in each of the first and second memory capacitors (Cma) (Cmb) of a plurality of pixels PX, the charge stored in the first and second liquid crystal capacitors (Clca) and (Clcb) of a plurality of pixels PX is reset, and then the charge stored in the first and second memory capacitors (Cma) and (Cmb) are respectively applied to the first and second subpixels (PXa) and (PXb) of the pixels PX provided in a plurality of pixel rows, so that the mixture of colors or images can be prevented. Further, the rear pixel row and the front pixel row are not simultaneously driven during two neighboring frames and the deterioration of the display quality can be prevented.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
   a substrate;
   a first gate line, a second gate line, a third gate line, a reference voltage line, at least one capacitance voltage line, and at least one data line formed over the substrate; and
   a plurality of pixels, wherein each pixel comprises:
      a first switching element and a second switching element each connected to the first gate line and the data line;
      a first memory capacitor connected to the first switching element and the capacitance voltage line;
      a second memory capacitor connected to the second switching element and the capacitance voltage line;
      a third switching element and a fourth switching element each directly connected to the second gate line and the reference voltage line;
      a fifth switching element directly connected to the third gate line and the first memory capacitor;
      a sixth switching element connected to the third gate line and the second memory capacitor;
      a first subpixel electrode connected to the third and fifth switching elements; and
      a second subpixel electrode connected to the fourth and sixth switching elements.

2. The display device of claim 1, wherein:
   the at least one data line includes a first data line and a second data line configured to receive data voltages having polarities different from each other,
   the at least one capacitance voltage line includes a first capacitance voltage line and a second capacitance voltage line configured to receive capacitance voltages having polarities different from each other,
   the first and second switching elements of a first pixel are connected to the first data line,
   the first and second memory capacitors of the first pixel are connected to the first capacitance voltage line,
   the first and second switching elements of a second pixel neighboring the first pixel are connected to the second data line,
   the first and second memory capacitors of the second pixel are connected to the second capacitance voltage line,
   the polarity of the data voltage applied to the first data line is the same as the polarity of the capacitance voltage applied to the first capacitance voltage line, and
   the polarity of the data voltage applied to the second data line is the same as the polarity of the capacitance voltage applied to the second capacitance voltage line.

3. The display device of claim 2, wherein:
   the first gate line is configured to receive a first gate-on signal,
   the second gate line is configured to receive a second gate-on signal after the first gate-on signal is applied to the first gate line,
   the third gate line is configured to receive a third gate-on signal after the second gate-on signal is applied to the second gate line, and
   the duration time of the third gate-on signal is greater than the duration time of each of the first and second gate-on signals.

4. The display device of claim 3, wherein the area of the first subpixel electrode is different from the area of the second subpixel electrode.

5. The display device of claim 3, wherein the capacitance of the first memory capacitor is different from the capacitance of the second memory capacitor.

6. The display device of claim 4, wherein the first subpixel electrode is connected to the third and fifth switching elements and wherein the second subpixel electrode is connected to the fourth and sixth switching elements.

7. The display device of claim 3, wherein the area of the first subpixel electrode is different from the area of the second subpixel electrode and wherein the capacitance of the first memory capacitor is different from the capacitance of the second memory capacitor.

8. The display device of claim 7, wherein the first subpixel electrode is connected to the third and fifth switching elements and wherein the second subpixel electrode is connected to the fourth and sixth switching elements.

9. The display device of claim 1, wherein:
   the first gate line is configured to receive a first gate-on signal,
   the second gate line is configured to receive a second gate-on signal after the first gate-on signal is applied to the first gate line,
   the third gate line is configured to receive a third gate-on signal after the second gate-on signal is applied to the second gate line, and
   the duration time of the third gate-on signal is greater than the duration time of each of the first and second gate-on signals.

10. The display device of claim 9, wherein the area of the first subpixel electrode is different from the area of the second subpixel electrode.

11. The display device of claim 9, wherein the capacitance of the first memory capacitor is different from the capacitance of the second memory capacitor.

12. The display device of claim 11, wherein the first subpixel electrode is connected to the third and fifth switching elements and wherein the second subpixel electrode is connected to the fourth and sixth switching elements.

13. The display device of claim 9, wherein the area of the first subpixel electrode is different from the area of the second subpixel electrode and wherein the capacitance of the first memory capacitor is different from the capacitance of the second memory capacitor.

14. The display device of claim 13, wherein the first subpixel electrode is connected to the third and fifth switching elements and wherein the second subpixel electrode is connected to the fourth and sixth switching elements.

15. A display device, comprising:
   a substrate;
   a plurality of reference voltage lines, a plurality of gate lines, a plurality of refresh gate lines, a plurality of update gate lines, a plurality of capacitance voltage lines, and a plurality of data lines;
a plurality of pixels each including at least two subpixels, wherein each subpixel comprises:
   a switching transistor connected to one of the gate lines and one of the data lines;
   a refresh transistor directly connected to one of the refresh gate lines and one of the reference voltage lines;
   an update transistor directly connected to one of the update gate lines, the switching transistor and the refresh transistor;
   a memory capacitor connected to one of the capacitance voltage lines and the update transistor; and
   a subpixel electrode connected to the refresh transistor and the update transistor,
wherein the subpixels of each pixel share the same reference voltage, gate, refresh gate, update gate, capacitance voltage and data lines.

16. The display device of claim 15, wherein two neighboring pixels share the same reference voltage, gate, refresh gate and update gate lines and are connected to different data and capacitance voltage lines.

17. The display device of claim 15, wherein the areas of the subpixel electrodes of each pixel are different from each other.

18. The display device of claim 15, wherein the capacitances of the memory capacitors of the subpixels of each pixel are different from each other.

19. The display device of claim 15, wherein, in one frame, each of the subpixels is configured to:
   receive a data voltage at the memory capacitor;
   reset the charge stored in the subpixel electrode; and
   apply the data voltage from the memory capacitor to the subpixel electrode.

20. The display device of claim 19, wherein the subpixels of each pixel are configured to substantially simultaneously receive the data voltages from the corresponding memory capacitors.

* * * * *